Patented Feb. 10, 1942

2,272,268

UNITED STATES PATENT OFFICE 2,272,268

ALKALI METAL SALTS OF DIHYDROXY HEXACHLORO DIPHENYL METHANE

William S. Gump, Nutley, N. J., assignor to Burton T. Bush, Inc., New York, N. Y., a corporation of New Jersey No Drawing. Application December 17, 1940, Serial No. 370,510

4 Claims. (Cl. 260—619)

This invention relates to a class of new substances, namely, the alkali metal salts of 2,2'-dihydroxy-3,5,6-3',5',6'-hexachloro diphenyl methane.

These metal salts may be formed from 2,2'-dihydroxy-3,5,6-3',5',6'-hexachloro diphenyl methane (M. P. 161°–162° C.) and the alkali metals, e. g. sodium, potassium and lithium. In general, the method employed includes adding an aqueous solution of the alkali metal hydroxide to a solution of the 2,2'-dihydroxy-3,5,6-3',5',6'-hexachloro diphenyl methane, followed by the addition of water to precipitate the alkali metal salt.

The salts of this invention are white, crystalline, substantially odorless substances which do not possess clearly-defined melting points, but decompose at varying temperatures upon heating. They are slightly soluble in water at room temperature, i. e. about 20°–25° C. and more soluble in boiling water. Their solubility in alcohol and acetone, even at room temperatures, is greater than their solubility in boiling water. The salts are more soluble in dilute alkalies than in water.

The substances of this invention may be used as antiseptic, bactericidal, bacteriostatic, fungicidal and preservative agents, in solid, liquid or emulsion form, either per se or in admixture with other substances.

The following illustrates how certain of these alkali metal salts may be prepared.

*Preparation of the mono-sodium salt of 2,2'-dihydroxy-3,5,6-3',5',6'-hexachloro diphenyl methane, having the probable structural formula:*

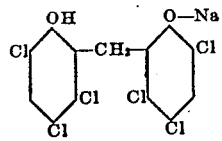

4.1 grams of sodium hydroxide (96%) are dissolved in 25 cc. of water at room temperature and this solution is added to a solution (also maintained at or near room temperature) of 2,2'-dihydroxy-3,5,6-3',5',6'-hexachloro diphenyl methane prepared by dissolving 40.7 grams of the 2,2'-dihydroxy-3,5,6-3',5',6'-hexachloro diphenyl methane in 25 cc. of acetone at about 50° C. To the resulting clear solution is added about 1000 cc. of water at room temperature (approximately 25° C.), whereupon a precipitate forms. This precipitate is filtered, washed with a little (about 50 cc.) water at room temperature and then dried for one day at about 45° C. 35 grams of a sodium salt of 2,2'-dihydroxy-3,5,6-3',5',6'-hexachloro diphenyl methane are obtained. This salt is a white, crystalline, substantially odorless solid. It is soluble in water at 20° C. to the extent of 1 part of salt to about 8000 parts of water; in boiling water, it is soluble to the extent of about 1 part of salt to 10 parts of water. The salt is more soluble in alcohol, acetone and dilute alkalies at room temperature than in boiling water. This salt, upon heating shows discoloration at about 260° C. with no evidence of melting.

Analysis of the sodium salt shows that it contains 4.7% sodium and 4.6% moisture. The metal salt was acidified and the original phenol recovered in known manner to the extent of about 91% of the weight of the metal salt. These data indicate that the salt is a mono-hydrated mono-sodium salt of 2,2'-dihydroxy-3,5,6-3',5',6'-hexachloro diphenyl methane.

By substituting an equivalent amount of lithium hydroxide (2.4 grams) or of potassium hydroxide (5.6 grams) for the sodium hydroxide used in the above example and proceeding according to the example just given, 38 grams of the mono-hydrated mono-lithium salt of 2,2'-dihydroxy-3,5,6-3',5',6'-hexachloro diphenyl methane or 43 grams of the corresponding potassium salt, respectively, are obtained. The physical properties possessed by these two latter-named salts are substantially the same as those given for the hydrated sodium salt. The lithium and potassium salts are both white, substantially odorless crystalline solids, appreciably soluble in dilute alkali solutions and in organic liquids such as, for example, acetone and alcohol. Other characteristics of the salts are shown by the following table:

| | Solubility of salt in water at 20° C. | Solubility of salt in boiling water | Temperatures of decomposition of salt |
|---|---|---|---|
| Mono-lithium salt of 2,2'-dihydroxy-3, 5, 6 - 3', 5', 6'-hexachloro diphenyl methane. | 1 part*/6,000 parts water. | 1 part/1½ parts water. | 240° C.—discoloration and some melting. |
| Mono - potassium salt of 2,2'-dihydroxy-3, 5, 6-3', 5'-6'-hexachloro diphenyl ethane. | 1 part/10,000 parts water. | 1 part/50 parts water. | 260° C.—discoloration but no melting. |

*All parts in table are by weight.

Analysis of the lithium and potassium salts also indicates these to be mono-hydrated mono-metal salts of 2,2'-dihydroxy-3,5,6-3',5',6'-hexachloro diphenyl methane, because the amount of metal and moisture found in each case and the amount of free phenol obtained by the acidification of the metal salt correspond to the theoretical amounts present in the mono-hydrated mono-lithium (or potassium) salt of 2,2'-dihydroxy-3,5,6-3',5',6'-hexachloro diphenyl methane.

The aforementioned mono-hydrated mono-alkali metal salts of 2,2'-dihydroxy-3,5,6-3',5',6'-hexachloro diphenyl methane lose their moisture content if heated for four hours at 125° C. This indicates that the moisture is present in the form of water of crystallization. The physical properties of the anhydrous salts formed by the heat treatment just referred to are substantially the same as those of the hydrated salts.

The 2,2'-dihydroxy-3,5,6-3',5',6'-hexachloro diphenyl methane mentioned in this application is a novel chemical substance, which together with the process of making it, is described and claimed in a co-pending application of the present applicant, S. N. 262,635, filed March 18, 1939, now Patent No. 2,250,480, issued July 29, 1941. The present application is a continuation-in-part of application S. N. 262,635.

2,2'-dihydroxy-3,5,6-3',5',6'-hexachloro diphenyl methane is obtained by the reaction of two molecules of 2,4,5-trichlorophenol with one molecule of formaldehyde in the presence of an acid condensing agent. The purified reaction product is a white, crystalline material having a melting point of 161°-162° C. More particularly, the method for making 2,2'-dihydroxy-3,5,6-3',5',6'-hexachloro diphenyl methane is as follows:

A mixture prepared from 200 parts 2,4,5-trichlorophenol, 36 parts methanol and 40 parts 35-40% formaldehyde solution is slowly added to 1440 parts sulfuric acid 93% with agitation, keeping the temperature betwen 0 and 5° C. The addition of the mixture should take about 4 hours, and when this point is reached, the agitation is continued for approximately 20 hours while maintaining the temperature at about 5° C. The finished reaction mixture is quenched on crushed ice and the crude dihydroxy hexachloro diphenyl methane is separated from the acid by filtration followed by washing with water. On drying, 200 parts of the crude product are obtained. The tan colored crude material is refined by dissolution in 15% aqueous sodium hydroxide solution, enough of this solution being employed so as to form the di-sodium salt of the dihydroxy hexachloro diphenyl methane. The alkaline solution is filtered to remove small amounts of alkali insoluble by-products formed in the reaction and the clear filtrate is acidified using hydrochloric or sulfuric acid in order to reprecipitate the phenolic compound. After washing the precipitate free from acid and drying, the compound is further refined by crystallization from benzene, toluene or ethylene dichloride, yielding thus a first crop of 100-110 parts of the pure dihydroxy hexachloro diphenyl methane in the form of white fine needles having a melting point of 161-162° C.

While the invention has been described in detail as to method and products, it is understood that changes may be made pertaining to both and hence no limitations on the invention are intended other than those imposed by the scope of the appended claims, construed as broadly as permissible in view of the prior art.

I claim:

1. Mono alkali metal salts of 2,2'-dihydroxy-3,5,6-3',5',6'-hexachloro diphenyl methane.
2. Mono-sodium salt of 2,2'-dihydroxy-3,5,6-3',5',6'-hexachloro diphenyl methane.
3. Mono-potassium salt of 2,2'-dihydroxy-3,5,6-3',5',6'-hexachloro diphenyl methane.
4. Mono-lithium salt of 2,2'-dihydroxy-3,5,6-3',5',6'-hexachloro diphenyl methane.

WILLIAM S. GUMP.

CERTIFICATE OF CORRECTION.

Patent No. 2,272,268. February 10, 1942.

WILLIAM S. GUMP.

It is hereby certified that error appears in the printed specification of the above numbered patent requiring correction as follows: Page 1, second column, lines 47 to 49 inclusive, in the table, for "Mono-potassium salt of 2,2'-dihydroxy-3,5,6-3',5'-6'-hexachloro diphenyl ethane" read --Mono-potassium salt of 2,2'-dihydroxy-3,5,6-3',5',6'-hexachloro diphenyl methane--; and that the said Letters Patent should be read with this correction therein that the same may conform to the record of the case in the Patent Office.

Signed and sealed this 14th day of April, A. D. 1942.

(Seal)

Henry Van Arsdale,
Acting Commissioner of Patents.